United States Patent [19]

Pearce et al.

[11] Patent Number: 5,258,581
[45] Date of Patent: Nov. 2, 1993

[54] PRODUCT FEEDING MECHANISM FOR A COMBINATION MACHINE

[75] Inventors: Larry N. Pearce, Oak Park; Ryszard B. Kozyra, Niles, both of Ill.

[73] Assignee: Triangle Package Machinery Company, Chicago, Ill.

[21] Appl. No.: 943,409

[22] Filed: Sep. 9, 1992

[51] Int. Cl.[5] ............................................ G01G 13/16
[52] U.S. Cl. ................................... 177/25.18; 364/567
[58] Field of Search ..................... 177/25.18; 364/567

[56] References Cited

U.S. PATENT DOCUMENTS

| | | |
|---|---|---|
| 3,108,647 | 10/1963 | Harmon et al. . |
| 3,939,928 | 2/1976 | Murakami et al. . |
| 4,398,612 | 8/1983 | Mikami et al. . |
| 4,552,236 | 11/1985 | Mikami . |
| 4,561,510 | 12/1985 | Sugioka et al. .................. 177/25.18 |
| 4,569,405 | 2/1986 | Izumi et al. . |
| 4,607,713 | 8/1986 | Nishi et al. . |
| 4,615,403 | 10/1986 | Nakamura . |
| 4,664,200 | 5/1987 | Mikami et al. . |
| 4,708,215 | 11/1987 | Nakamura et al. . |
| 4,711,345 | 12/1987 | Fukuda et al. ............... 177/25.18 X |
| 4,844,191 | 7/1989 | Mikami et al. . |
| 4,966,273 | 10/1990 | Sashiki . |

*Primary Examiner*—George H. Miller, Jr.
*Attorney, Agent, or Firm*—Willian Brinks Olds Hofer Gilson & Lione

[57] ABSTRACT

A radial combination weighing machine having a nutating distribution disc that imparts a radially outward directional force to product that is deposited on its upper surface.

31 Claims, 5 Drawing Sheets

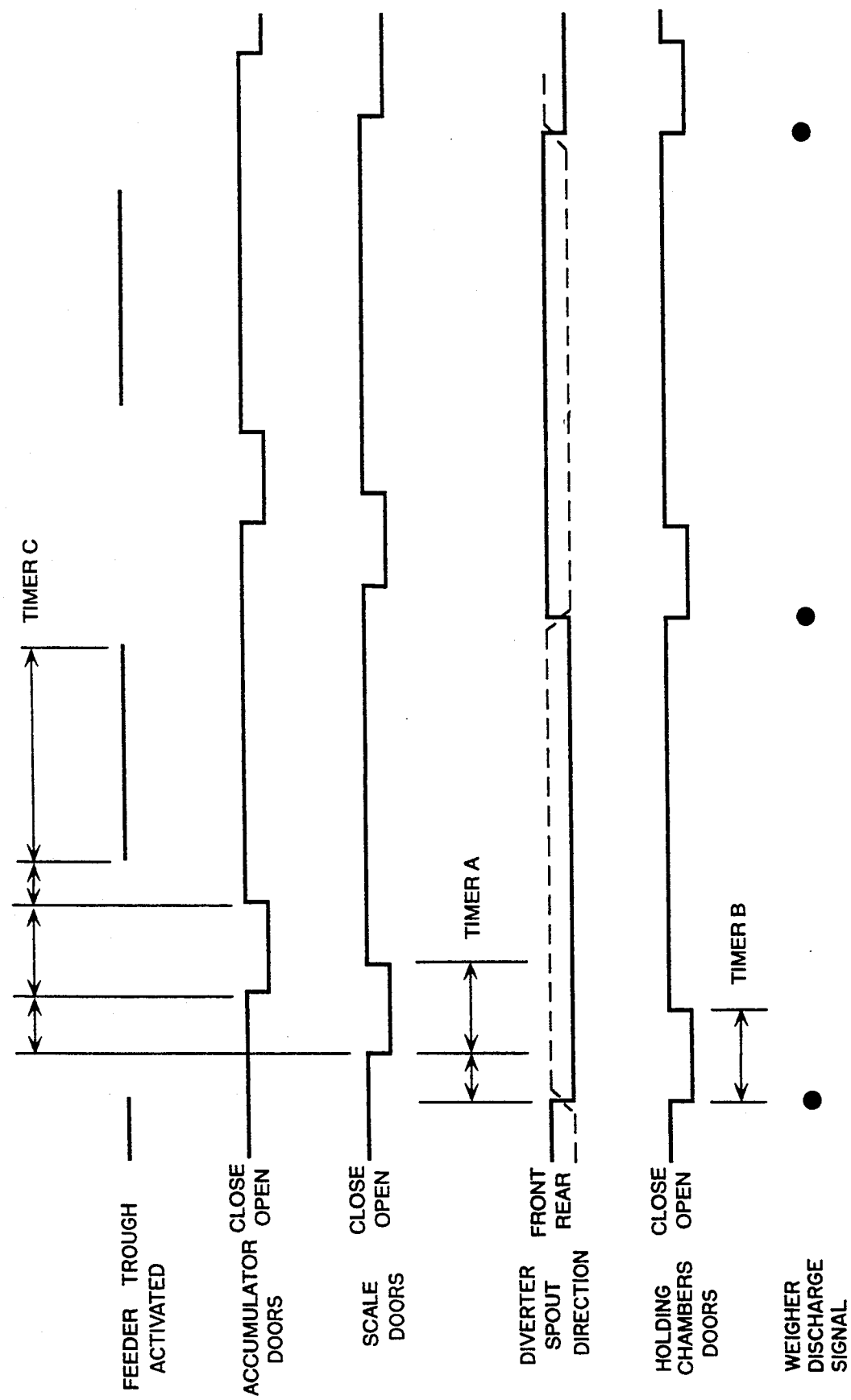

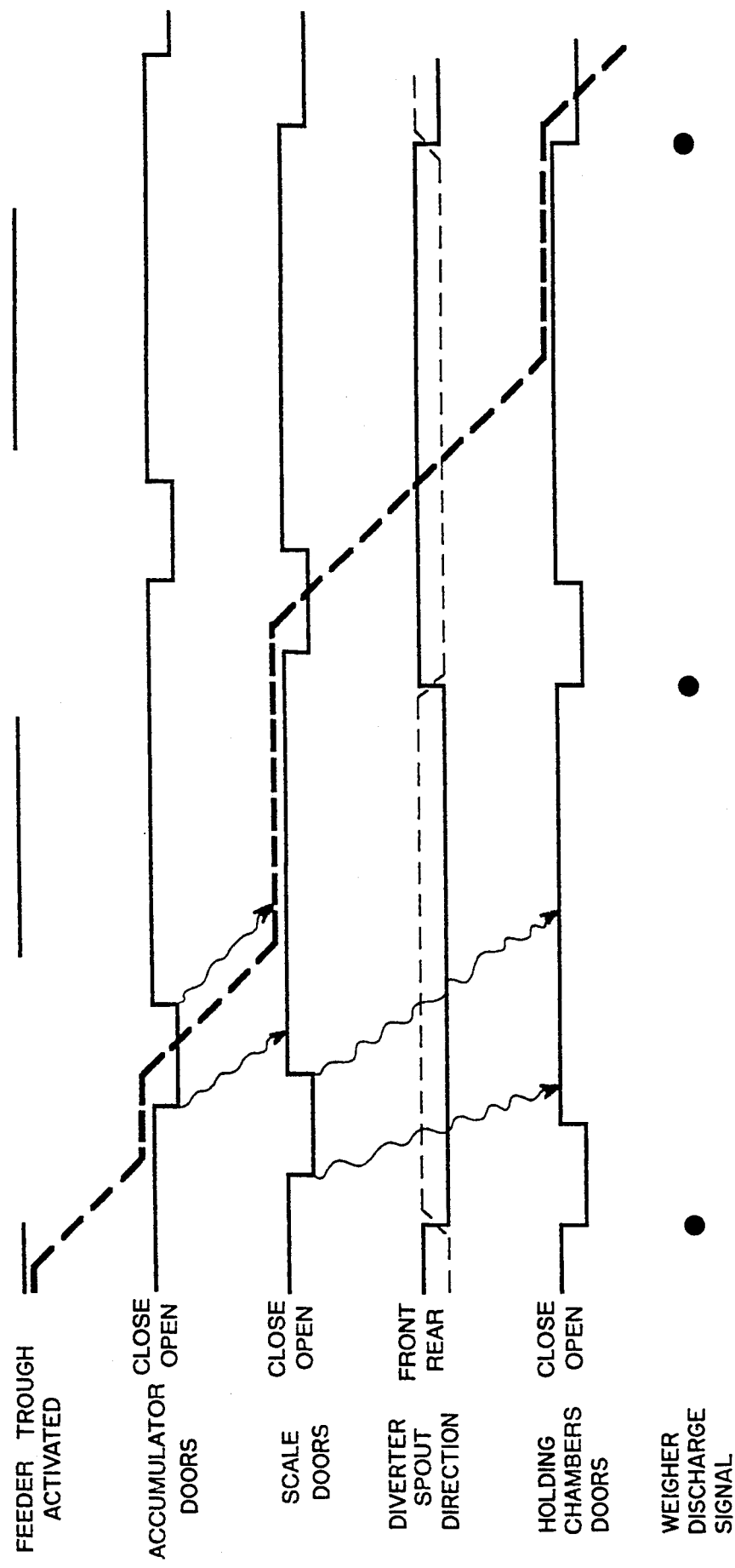

PRODUCT FEEDING MECHANISM FOR A COMBINATION MACHINE

FIELD OF THE INVENTION

This invention relates generally to a circular or radial combination weighing machine for providing, from a variety of product sources, a continuous flow of discrete quantities of solid product with each quantity having a predetermined target weight, or a weight very close thereto. More particularly, the invention is an improvement upon known circular or radial combination weighing machines, which improvement utilizes a nutating distribution disc that imparts a radial movement to the product that is deposited upon it.

BACKGROUND OF THE INVENTION

The radial combination weighing machine with a nutating distribution disc is an improvement upon the combination weighing machines of the type generally described and claimed in commonly owned U.S. Pat. Nos. 4,630,695 and 4,901,807, the specifications and drawings of which are incorporated herein by reference.

When using a combination weighing machine of the type disclosed in the above referred to U.S. Pat. Nos. 4,630,695 and 4,901,807, a target package weight is preselected. Fractional amounts of the target package weight, which shall be referred to as product batches, are metered through a plurality of product batch handling units. Each separate product batch handling unit includes, in addition to other components, a radially extending product feeder trough, an accumulation chamber and a weighing device. The weighing device weighs the product batch that has been metered to it and records the weight; the weighed product batch is stored either in a weigh bucket associated with the weighing device or in a holding chamber disposed therebelow.

The weight of the product batches that are metered to the weighing devices can be controlled, for example by controlling the feed time for the conveying mechanism that meters out the product batches. When a complete set of product batches has been weighed, recorded and stored then the total weights for all combinations that can be formed using all available product batches is calculated and compared to the target package weight. A best combination that is equal to or within a predetermined range of the target package weight is selected. After the product discharge has been completed the selected holding chambers are discharged into a collection chamber for the formation of a package, the discharged holding chambers are then replenished and the cycle of selecting another best combination is repeated.

The likelihood of achieving an acceptable combination increases as the number of product batches used to fulfill the target package weight increases and as the number of holding chambers available to choose from increases. The latter of these two variables is fixed for a given machine and thus fine tuning of the system usually involves adjustments to the weight of the fractional amounts. For example if the target package weight is six (6) ounces, the product batches are about two (2) ounces and there are eight (8) holding chambers available to choose from, then the likelihood of achieving an acceptable combination would be increased by reducing the weight of the product batches to about one-and-one-half (1½) ounces.

The prior art combination weighing machines are of two types, in-line and radial. The in-line type machines have the weighing devices arranged side by side. The radial type machines have the weighing devices spaced around a circle. As disclosed in the above identified U.S. Pat. Nos. 4,630,695 and 4,901,807, a single weighing device, which is the most expensive component of the combination weighing machine, can function to weigh product for multiple holding chambers, thus decreasing the per holding chamber cost of the machine. This can be accomplished, for example, by feeding the product from the weighing device through a diverter that functions to direct the product to one or another of the associated holding chambers.

In radial weighing machines a product source can deposit bulk product on a stationary conical disc located at the center of the circle around which the weighing devices are located. The product flows radially outwardly along the upper surface of the stationary conical disc. The product discharges from the stationary conical disc into radially extending feeder troughs that can be driven, for example, by a vibratory drive for discharge into an accumulation chamber. A drive such as this is disclosed in the U.S. Pat. No. 3,108,647 to Harmon et al. In Harmon et al, this type of drive was used for topping off the weighing buckets, but could have been used in radial combination weighing machine such as are disclosed in FIGS. 5 and 6 of the above referred to U.S. Pat. No. 4,901,807. A distribution table formed of a stationary conical disc imparts only radial movement to the product, which is the desired directional movement for the product. However, some products stick to the stationary conical disc and thus do not feed consistently with such a system. To remedy this, power means can be provided to impart rotational or spiral reciprocating vibratory motion to the distribution disc. Drives such as this have the disadvantage that they impart an undesirable circumferential direction of motion to the product as it is discharged from the distribution disc to the radial troughs. This not only unnecessarily increases the power requirements, imparts an undesirable direction of movement to the product but can also result in product missing the radial troughs and being wasted.

It is a primary objective of the present invention to provide a distribution disc that imparts motion to the product that has been deposited thereon causing the product to move in the radial direction.

Another objective of the present invention is to provide a distribution disc that nutates to create a feed action to product deposited on the distribution disc of varying amplitude.

Still another objective of the present invention is to provide a radial combination weighing machine with a nutating distribution disc that imparts motion to product that has been deposited thereon only in the radial direction.

Yet another objective of the present invention is to provide a radial combination weighing machine with a dynamically balanced nutating drive for the distribution disc that will not introduce undesirable vibrations into the machine.

SUMMARY OF THE INVENTION

To achieve these and other objectives, the present invention provides a new and unique nutating drive for the distribution disc of a radial combination weighing machine.

A preferred embodiment of the invention includes a cylindrical drive transfer member that has an outer cylindrical drive surface formed about an axis that is not parallel to its driven axis.

An advantage of the present invention is that the motion that is imparted to the product can be changed over a wide range by utilizing a drive transfer member having an appropriate axis offset.

Another advantage of the present invention is its ability to disperse a wide variety of products after making minimal adjustments to the drive.

These and other objects and advantages of the present invention will become apparent to those skilled in the art from the following detailed description of the preferred embodiment, the accompanying drawings and the claims.

BRIEF DESCRIPTION OF DRAWING

FIG. 3 is a time diagram of various timers that are part of the logic of the combination weighing machine.

FIG. 4 is a time diagram used to illustrate and describe the path of a single piece of product through the batch handling mechanism.

DETAILED DESCRIPTION OF THE PREFERRED EMBODIMENT

Figure 2:
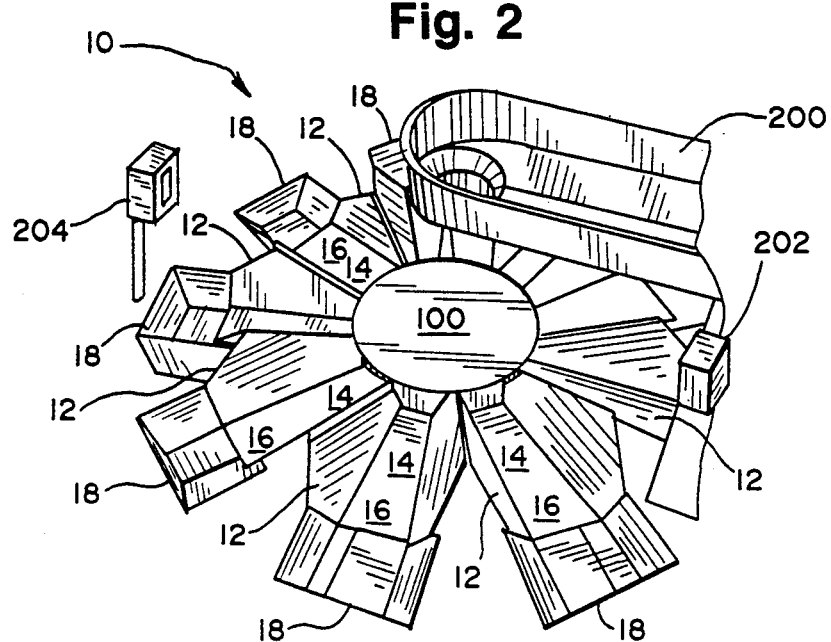
FIG. 2 is a perspective view looking down on the radial combination weighing machine of FIG. 1.
Figure 1:
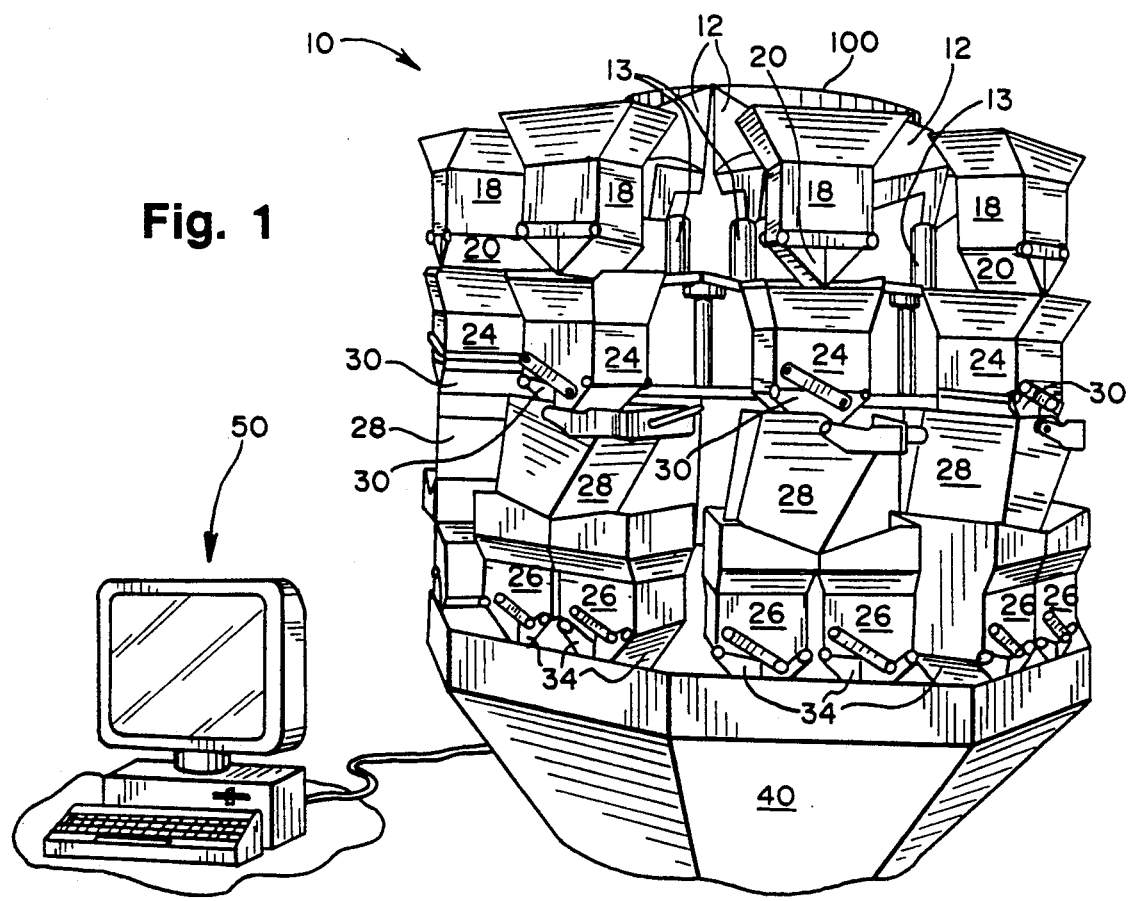
FIG. 1 is a perspective view of a radial combination weighing machine.

Referring to FIGS. 1 and 2, there is shown a radial combination weighing machine 10 of the type in which the preferred embodiment of this invention is intended to be used.

FIG. 2 is a view looking down on the top of the radial combination weighing machine 10 of FIG. 1, and shows a discharge spout 200 for an external bulk product source. The discharge spout 200 is located such that a stream of bulk product can be fed to and deposited at the center of the machine's nutating distribution disc 100. The external bulk product source is automatically cycled on and off in response to sensing devices 202 and 204 that respond to the level of product on the distribution disc 100. Means 202 and 204 are provided to cycle the bulk product source on and off to insure an adequate supply of product on distribution disc 100 at all times and to prevent an unacceptable build up of product on the disc. Means 202 and 204 can be a pair of light beams that are directed parallel to and above the upper surface 102 of the distribution disc toward a light beam receptor. If the bulk product source is not operating and the level of bulk product is below the level of the light beams, then the lower light beam strikes the receptor which causes the external bulk product source to be cycled on. If the bulk product source is operating and the upper light beam is completely blocked by the build up of bulk product on the upper surface of the distribution disc the external bulk product source will be cycled off. It will be appreciated that other feeding apparatus may be used within the teachings and scope of this invention.

As seen in FIG. 1, a computer system 50 is used to monitor and control various components of the combination weighing machine 10 as well as related packaging machinery. For example the computer system 50 can be programmed to energize or de-energize the bulk product source in response to signals from sensing devices 202 and 204, to open or close the doors for a particular accumulation chamber 18, weigh bucket 24, or holding chamber 26, or to position a diverter 28. It should be noted that although the accumulation chambers, weigh buckets and holding chambers disclosed herein each have a set of discharge doors, a single door design could be used in place of the double door design. When the term "door" is used herein to define the discharge means for the accumulation chambers, weigh buckets or holding chambers it should be interpreted to means either a single or multiple door design. The computer system's board includes input and output ports for connecting input and output attachments such as a keyboard or a touch screen. The computer system 50 receives information regarding the weight of the product in the holding chambers and functions as a recording device to record the weight of each batch of product and its storage location. Other information is supplied to the computer system 50 through software programs, data files and from various sensing devices located in components of the machine. This may include information unique to the product being weighed, the target weight, the range of acceptable weights, the length of time or amplitude of vibration for the feeder trays, or other characteristics of the product being weighed. The computer system 50 is programmed to function as a combination computing unit for carrying out the various calculations and to select a best combination of product batches having a total weight that satisfies predetermined conditions. The above mentioned functions of the computer system 50 are currently performed in the prior art machines.

The distribution disc 100 is driven continuously by a nutating drive, and its nutating motion imparts radial movement to product that is deposited on the distribution disc 100. A plurality of radially extending product feeder troughs 12 are mounted on the machine frame such that their receiving ends 14 underlie the periphery of the distribution disc 100. The radial movement imparted to the product that has been deposited on the distribution disc 100 causes the product to fall into the receiving ends 14 of the product feeder troughs 12.

The product feeder troughs include electrically driven vibrators 13 that are cycled on and off at appropriate times by the computer system 50. The product feed troughs 12 are cycled on after a corresponding holding chamber has been selected and discharged to form a package. Thus the distribution disc 100 and the feeder troughs 12 cooperate to function as a feeder mechanism for initial product batches.

There is an accumulation chamber 18 at the discharge end 16 of each product feeder trough 12. The product feeder troughs 12 are programmed to remain on for a predetermined time during which product advances along the trough from the receiving end 14 toward the discharge end 16 and into an accumulation chamber 18. The product feed troughs 12, which are cycled on and off, thus feed an initial batch of product to the accumulation chambers 18. The approximate weight or amount of this initial product batch can be controlled by adjusting the time period that the product feed troughs 12 remain on. Such an adjustment can be made by a keyboard or touch screen input to the computer system 50. The accumulation chambers 18 include doors 20 that can be opened and closed by mechanical or electromechanical devices. Each electro-mechanical device is independently controlled by the computer system 50 such that each set of doors 20 acts independently of the doors on the other accumulation chambers 18.

The accumulation chambers 18 discharge into weigh buckets 24 which are associated with weighing devices. The weighing devices determine the weights of the product batches, and transmit the weights in digital form to the computer system 50. The weigh buckets 24 have doors 30 controlled by mechanical or electromechanical devices that are independently actuated by the computer system 50. A diverter 28 is located below the doors 30 of each weigh bucket 24. Diverters 28 can be positioned by mechanical or electro-mechanical devices to direct the product from the weigh bucket 24 into the proper holding chamber 26. There are two holding chambers 26 disclosed for each product batch handling unit. Each holding chamber 26 has a set of doors 34 that are controlled by a mechanical or electromechanical device, which can be energized by the computer system 50 at the appropriate time in the cycle. When a set of doors 34 of a holding chamber 26 is opened the product batch stored in that holding chamber 26 is discharged into the collecting hopper 40.

Another embodiment of combination weighing machine 10, discharges the weighed product batches directly from the weigh buckets 24 into the collecting hopper 40. In this second embodiment the diverters 28 and the holding chambers 26 along with their operating mechanisms have been eliminated. As has been previously stated the terms holding chamber or holding chambers when used in the claims of this patent should be interpreted to mean the compartment or compartments from which the product batches are fed to the collecting hopper 40.

Referring now to FIG. 3, a general explanation of the logic, or how a combination weighing machine is programmed, follows. This discussion will begin at the point in the sequence when the "WEIGHER DISCHARGE SIGNAL" is given, which occurs after the best combination has been selected. The WEIGHER DISCHARGE SIGNAL is indicated by a black dot in the last line of FIG. 3. When the WEIGHER DISCHARGE SIGNAL is received several things are initiated. First the appropriate holding chamber doors is caused to open. Second, it causes the diverter spout to swing to the front or rear, and third it starts Timers A and B. Timer B times the duration that holding chamber doors 34 are open. In combination weighing machines that do not utilize a staggered discharge all holding chamber doors open and close at the same time and thus the duration of time that the holding chamber doors remain open is equal. In combination weighing machines that do utilize a staggered discharge, all holding chamber doors open at different times and generally close at the same time. Thus, in combination weighing machines that utilize a staggered discharge, the duration of time that the holding chamber doors remain open is dependent upon the logic of the particular staggered discharge system. The subject invention may be used in a combination weighing machine that utilizes a staggered discharge; however, that staggered discharge is not a part of the present invention or the prior art; rather, such staggered discharge is disclosed and claimed in commonly owned and pending application Ser. No. 07/936,027, filed Aug. 26, 1992, the disclosure of which is incorporated herein by reference.

Timer A is programmed for two consecutive time intervals, the first being a time delay period following the WEIGHER DISCHARGE SIGNAL before the scale doors 30 opens, and the second being the time duration that doors 30 remain open.

Timer A activates Timer C when a set of scale doors 30 opens. Timer C has four consecutive intervals: the first interval being a delay period until the set of accumulator doors 20 opens: the second interval being the time interval that set of accumulator doors 20 remains open; the third being a time period delay before initiating vibration of the feeder trays 12; and the fourth interval being the time duration that the feeder trays are vibrated.

The various delays discussed with reference to FIG. 3 can be best understood by following a single piece of product as it progress through the product batch handling unit. In FIG. 4, the wavy lines indicate product falling from the accumulation chamber 18 to the scale or weigh bucket 24 and from the scale through the diverter spout 28 to the holding chamber 26.

It should be noted that the scale doors opens before the holding chamber doors close, and the accumulator doors opens before the scale doors close. It takes the product a certain time to fall from the scale doors 30 to the bottom of the holding chambers and from the accumulator doors 20 to the bottom of the scale. Before these certain time periods have elapsed the accumulator doors 34 and the scale doors 30 will have closed. This is a good example of the precision timing that is required in modern combination weighing machines. In FIG. 4, the heavy dashed line represents a typical pathway for a single piece of product through a product batch handling unit of a combination weighing machine.

Figure 5:
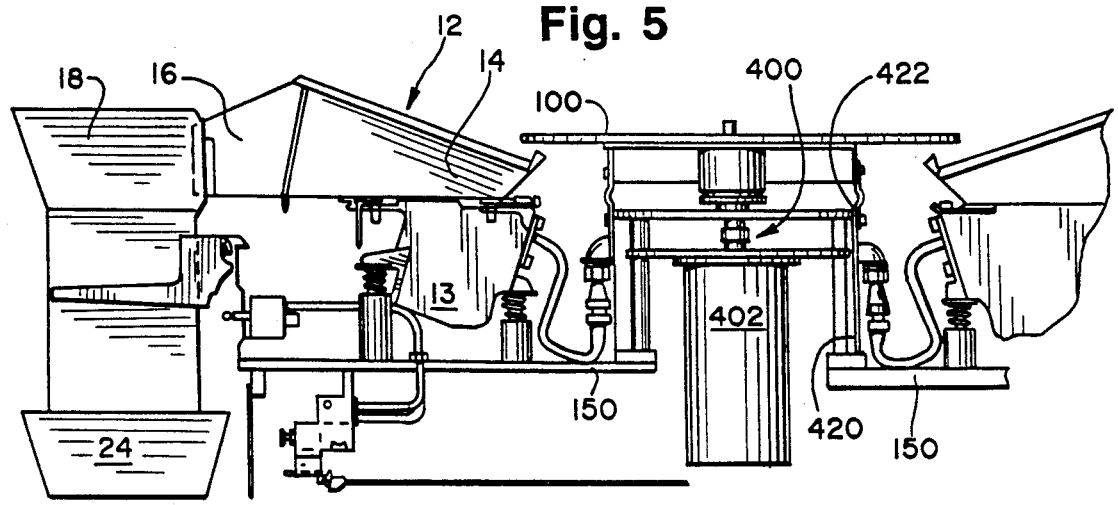
FIG. 5 is a side view of the feeder mechanism portion of the combination weighing machines including the drives therefor.

In FIG. 5 the relationship of the distribution disc 100, feeder troughs 12, an accumulation chamber 18 and a weigh bucket 24 are shown in a side view. Product that is deposited on distribution disc 100 is caused to move radially outwardly as a result of the nutating movement of disc 100. Distribution disc 100 operates continuously causing a continuous flow of product over its peripheral edge that falls into the receiving ends 14 of the feeder troughs 12. Feeder troughs 12 are mounted on individual, electrically driven vibrators 13 that are cycled on after a corresponding holding chamber has been used as a batch in a desired combination. The vibrators 13 are programmed to run for a specific time period which can be adjusted or modified by a keyboard or touch screen entry to the computer system 50.

Figure 6:
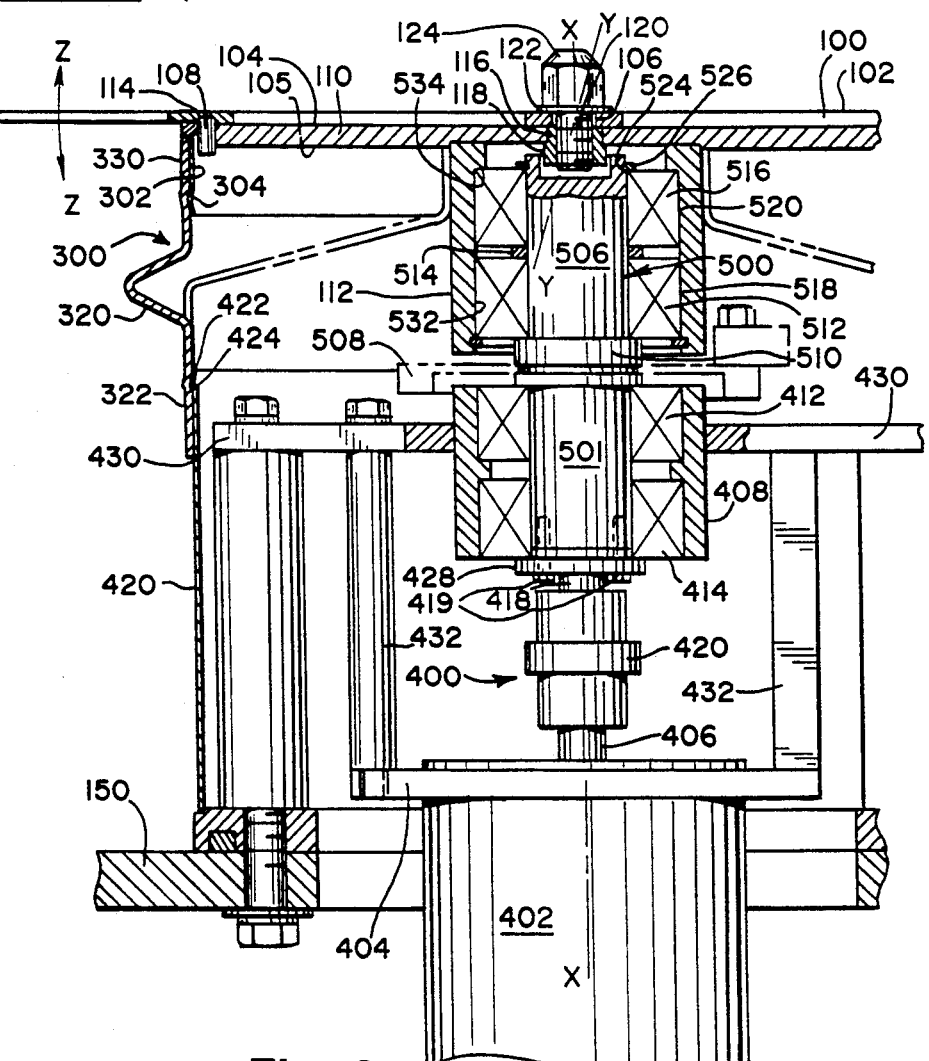
FIG. 6 is a cross section side view of the nutating drive for the distribution disc.

Referring now to FIG. 6, the distribution disc 100 and the nutating drive means for imparting a nutating motion thereto will be described. In the preferred embodiment distribution disc 100 is a flat circular disc having an unencumbered upper surface 102, a bottom surface 104 and a central opening 106. A pin 108 protrudes upwardly from the top surface 104 of disc 110 and is received in an opening 114 formed in the bottom surface of distribution disc 100 that overlies bottom disc 110. It should be noted that opening 114 does not extend through the distribution disc 100. The pin, 108 in cooperation with opening 114 and a threaded cap 124, permits the quick connection and disconnection of the disc 100 and 110. This quick connect and disconnect permits replacement of the disc 100 with another disc having upper surfaces of different contours. The quick connect and disconnect also permits the interchange of drive transfer members 500. As shall be discussed in greater detail, this interchange allows the aggressiveness of the nutating motion to be changed. The disc 100, bottom drive disc 110 and a cylindrical drive member 112 together function as a distribution disc drive assembly. The upper disc 100 and bottom drive disc 110, when interconnected, perform the single function of the distribution disc 100. The bottom disc 110 underlies distribution disc 100 which has an opening 114 that is sized and located to receive pin 108 that protrudes upwardly from bottom disc 110. Bottom disc 110 has a central opening 116 that is concentric with central opening 106 in disc 100. An internally threaded collar 118 is secured in central opening 116 as by welding. A threaded stud shaft 120 is threaded into collar 118 and protrudes up and through the central opening 106 of disc 100. A washer 122 is placed over the upper end of threaded stud shaft 120 and is secured by an internally threaded cap 124. The preferred distribution disc 100 can be removed and replaced by unscrewing internally threaded cap 124 and lifting distribution disc 100 off, placing a different distribution disc in its place and reapplying internally threaded cap 124. Thus, changing from one distribution disc can be accomplished with out any disassembly of the machine in a quick and convenient manner.

Means 300 are provided for restricting the distribution disc drive assembly from rotating. A cylindrical motor shroud 420, constructed from rigid material such as stainless steel, is secured to the machine frame 150 and extends upwardly therefrom. The cylindrical motor shroud 420 is concentric with distribution disc 100 and terminates in an upper end portion 422 that is spaced below the distribution disc 100. There is an outwardly projecting ridge 424 (see FIG. 6) formed along the upper end portion 422. A cylindrical collar 302, constructed from rigid material such as stainless steel, is secured to the lower surface 105 of the bottom drive disc 110. Cylindrical collar 302 has an outwardly projecting ridge 304 along its lower edge. A restraining device in the form of a tubular bellows 320 made from soft flexible material is connected along its upper edge, by a clamp 330, to cylindrical collar 302 and along its lower edge, by a clamp 322, to the upper end portion 422 of the cylindrical motor shroud 420. It should be noted that outwardly projecting ridges 304 and 424 cooperate with clamps 330 and 322, respectively, to crimp a portion of the soft flexible material of tube 320 to secure the upper and lower attachment of the flexible tube 320. The primary purpose of tube 320 is to prevent rotation of the distribution disc 100 without interfering with its nutating motion. Of course, since distribution disc 100 is an integral part of the distribution disc drive assembly, tube 320 prevents the entire assembly from rotating. In addition to its primary purpose, of preventing rotation of distribution disc drive assembly, the flexible tube 320 also functions to seal out dirt and other debris from the area of the drive means 400, and as a result of its flexible nature, will not interfere with the nutating movement of distribution disc 100.

A second embodiment of the restraining tube 320 is shown in phantom lines in FIG. 6. Tube 320 is connected along its bottom edge to the upper end portion 422 of cylindrical motor shroud 420 by clamp 322 and along its upper edge to cylindrical drive member 112. Since there is less vertical movement at the center of disc 100 than at its periphery this second embodiment will not be flexed to the extent of the first embodiment.

The drive means 400 for the distribution disc 100 is a rotary power source such as an electric motor 402. An end plate 404 of the electric motor 402 is rigidly connected to an upper mounting plate 430 by a plurality of spacers 432. Electric motor 402 has an upwardly extending output shaft 406 that lies along a first axis identified as X—X. An upper bearing 412 and a lower bearing 414 are secured to a bearing holder 408 that is connected as by welding to mounting plate 430. Bearings 412 and 414 are double row ball bearings and thus function as both rotary and thrust bearings. These bearings are mounted such that they are concentric with openings 106 and 116 and with axis X—X. Shaft 418 is an extension of motor output shaft 406 and is connected thereto by coupler 420. A flange 428 at the upper end of shaft 418 is connected by bolts 419 to the lower end of drive transfer member 500. Drive transfer member 500 has a lower cylindrical surface 501 that is concentric with axis X—X and is in contact the with inner races of bearings 412 and 414. The drive transfer member 500 also has an upper tubular member that has an upper cylindrical surface 506. Upper cylindrical surface 506 is generated about a second axis designated Y—Y that intersects with axis X—X. The point of intersection of the X—X and Y—Y axes is the epicenter of the nutating drive. Axes X—X and Y—Y, in a preferred embodiment, intersect at the center of gravity of the distribution disc drive assembly which is located at a point between the distribution disc 100 and the bottom drive disc 110. The axes intersect at an angle of about 1°. This small angle of intersection between axes X—X and Y—Y has been exaggerated in FIG. 6 for illustration purposes. A counterbalance 508 is secured to drive transfer member 500 below cylindrical surface 506. The counterbalance is shaped or weighted to offset the difference in the center of gravity of drive transfer member 500 and the distribution disc drive assembly, so that these members will be dynamically balanced when operating.

In the preferred embodiment, in which axis X—X and Y—Y intersect at the centers of gravity of the distribution disc drive assembly, the nutating drive is dynamically balanced and therefor a counterbalance is not needed. For the preferred embodiment, member 508 can be eliminated.

A shoulder 510 is provided on outer cylindrical surface 506 that supports a lower ball bearing 512 which fits closely on the outer cylindrical surface 506. A spacer 514 is provided between lower ball bearing 512 and an upper ball bearing 516. The outer cylindrical surfaces 518 and 520 of lower and upper ball bearings 512 and 516, respectively, are coaxial with outer cylindrical surface 506 and in fact function as though they are the outer cylindrical surface 506. A groove 524 is formed in outer cylindrical surface 506 for reception of a spring clip 526 for limiting upward movement of the upper and lower ball bearings 516 and 512 along cylindrical surface 506.

Cylindrical drive member 112 which has a cylindrical bore 532, is secured to the lower surface 105 of bottom disc 110 and extends downwardly therefrom. The cylindrical bore 532 is perpendicular to the upper surfaces 102 of distribution disc 100 and opens downwardly. The cylindrical bore 532 is dimensioned to closely receive the outer cylindrical surfaces 518 and 520 of the lower and upper ball bearings 512 and 516, respectively. The cylindrical bore 532 has a shoulder 534 formed at its upper end that rest on the upper surface of upper ball bearing 516.

In the preferred embodiment the distribution disc 100 is restrained from rotating. However, as a result of the angle between axis X—X and axis Y—Y, a nutating motion is transmitted from output shaft 406 and drive transfer member 500 to cylindrical drive member 112 and distribution disc 100. This nutating motion of the distribution disc 100 imparts a radial outward movement to product that has been deposited on the upper surface 102 of the distribution disc 100. As indicated by the arc designated Z—Z in FIG. 6, generated from the epicenter of the nutating drive, a hypothetical point on the upper surface of distribution disc 100 follows arc Z—Z at a moment in the rotation of drive transfer member 500. This hypothetical point travels along a circular path, in a wave like fashion, around the distribution disc 100 during each rotation of drive transfer member 500.

In the preferred embodiment of the nutating drive, in which the X—X and Y—Y axes intersect between distribution disc 100 and bottom drive disc 110, there is very little movement at the center of the upper surface 102 of distribution disc 100. However points along the outer periphery of the upper surface 102 move up and down about an arc generated from the intersection of axes X—X and Y—Y.

Bulk material deposited on the upper surface 102 of the distribution disc 100 would, if distribution disc 100 were stationary, accumulate to a height at which the angle of repose of the product is reached, at which point the product would begin flowing over the peripheral edge of the distribution disc 100. By providing a nutating drive to the distribution disc 100 the product need not accumulate to the point where its angle of repose is reached.

When a hypothetical point at the outer periphery of the distribution disc 100 is at its lowest point in the nutating cycle the angle of repose for product carried by the distribution disc has been decreased by the angle that a line extending through the hypothetical point on the distribution disc through the center of the distribution is to the horizontal. This factor, of its self, will cause product flow radially outwardly of the distribution disc that would not have occurred if the flat distribution disc 100 had remained stationary. When the hypothetical point on the distribution disc begins moving upwardly from its nadir, it imparts movement to the product that includes a radial outward component. This radial outward component imparts a positive directional movement to the product supported on the upper surface 102 of distribution disc 100. The aggressiveness of this component of force increases as the angle between the X—X and Y—Y axes increases. Thus, in a design in which the X—X and Y—Y axes intersect six (6) inches above the outer surface 102 of the distribution disc, the radial outward force on product supported on the distribution disc will be more then in a design, as in the preferred embodiment, where the axes intersect at substantially the level of the outer surface 102. The preferred embodiment has the added advantage that, because the center of gravity of the distribution disc drive assembly is at the epicenter of the nutating drive, undesirable vibrations are eliminated. The elimination of vibrations reduces the likelihood of fatigue failure of all components of the machine.

If a less aggressive radial outwardly force is required, then a different drive transfer member 500 can be utilized. Changing from one drive transfer member to another can be quickly and easily accomplished by first removing the distribution disc drive assembly by unscrewing the cap 124, and then removing the drive transfer member 500 after loosening bolts 419. This process is reversed to mount a new drive transfer member 500.

Combination weighing machines process a great variety of products, some of which have unique feeding characteristics. Although applicant preferred flat unencumbered distribution disc functions well for most products the processing of some products can be improved by the use of distribution discs having uniquely contoured upper surfaces. Some of such alternative distribution discs are illustrated in FIGS. 7 through 10.

Figure 7:
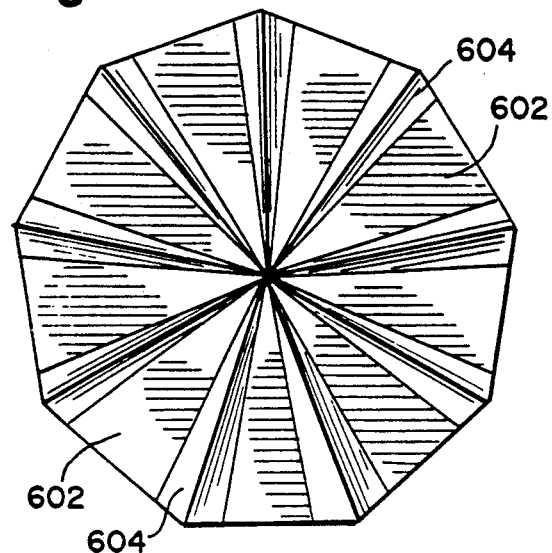
FIG. 7 is a plan view of another embodiment of distribution disc.
Figure 8:
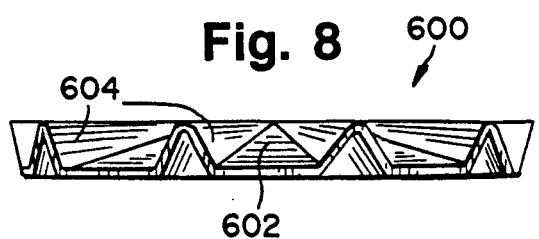
FIG. 8 is a side view of the distribution disc shown in FIG. 7.

Referring now to FIGS. 7 and 8, another embodiment of a distribution disc is illustrated. This distribution disc 600 can be fabricated from a single piece of sheet material that has been bent to form the various facets of the upper surface. The upper surface of distribution disc 600 includes a plurality of wedge shaped surfaces 602 the apexes of which converge at the center of the distribution disc. The center of the distribution disc is at a higher level than the peripheral edges of the disc. The elevation or angle of wedge shaped surfaces 602 can be best seen in FIG. 8. Adjacent wedge shaped surfaces 602 are separated by wedged shaped ridges 604 that have an inverted V-shaped cross section. The product flow will, as a result of the contour of the upper surface of this distribution disc, be confined to the wedge shaped surfaces 602 and will be concentrated to a narrower stream of material than in the earlier embodiment.

Figure 9:
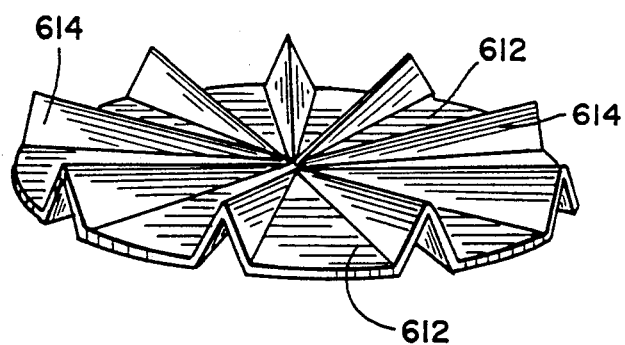
FIG. 9 is a perspective view of another embodiment of distribution disc.

Referring now to FIG. 9, another embodiment of a distribution disc 610 is disclosed. This embodiment has wedge shaped surfaces 612 that define the flow path of the stream of product. In this embodiment, the wedge-shaped surfaces 612 are flat rather than raised. The wedge-shaped surfaces 612 are separated by radially extending ridges 614 that have inverted V-shaped cross sections. This embodiment would be less aggressive than the embodiment disclosed in FIGS. 7 and 8 as a result of the flat rather than inclined wedge shaped feed surfaces.

Figure 10:
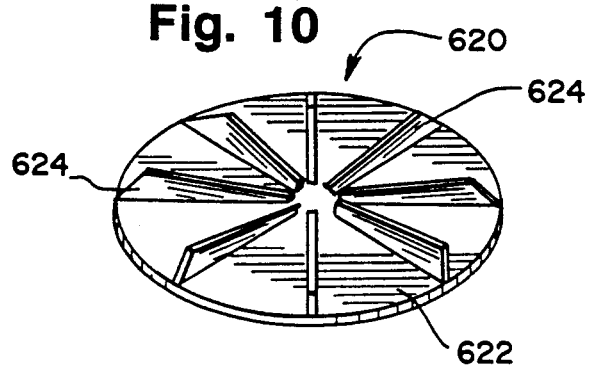
FIG. 10 is a perspective view of another embodiment of distribution disc.

Referring now to FIG. 10, another embodiment of distribution disc 620 is disclosed. This embodiment is fabricated from a flat disc 622 that has a plurality of radially extending fins 624 protruding upwardly therefrom. The radially extending fins 624 give the product that has been deposited on the disc 620 positive guidance as the nutating drive exerts a radially outwardly directional force on the product.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of metering out package weight quantities of solid product from a stream of bulk product, each package weight quantity being of a weight within established limits of a target weight, which comprises the steps of:

(a) establishing a target package weight and acceptable limits thereto;

(b) feeding bulk product to a distribution disc; and (c) imparting a nutating motion to the distribution disc drive assembly to impart a feeding motion to bulk product deposited on the distribution disc.

2. The method as set forth in claim 1 including the further step of:

(d) monitoring the level of bulk material on the distribution disc;

(e) interrupting the feed of bulk product to the distribution disc when the level of product exceeds a predetermined level; and (f) reestablishing the feed of bulk product to the distribution disc when the level of product falls below a predetermined level.

3. The method as set forth in claim 1 including the further step of:

(g) adjusting the amplitude of the nutating motion being imparted to the distribution disc drive assembly such that it is compatible with the product being packaged, its handling characteristics and the target weight of the package.

4. The method as set forth in claim 1 including the further step of:

(h) dynamically balancing the distribution disc drive assembly to eliminate vibrations by locating the epicenter of the nutating drive at the center of gravity of the distribution disc drive assembly.

5. The method as set forth in claim 1 including the further step of:

(i) retaining the distribution disc drive assembly from rotary movement such that only radial directional motion is imparted to bulk product deposited on the distribution disc.

6. A method of feeding product batches to a plurality of product batch handling units in a combination weighing machine comprising the steps of:

(a) arranging said product batch handling units, selected ones of which will contribute to each product discharge, with an accumulator chamber associated with each unit and being disposed in position to receive initial product batches;

(b) disposing a plurality of product feeder troughs in position to feed products to said accumulator chambers;

(c) operating a selected combination of said product batch handling units after a product discharge to discharge the accumulator chambers of units that were included in the product discharge;

(d) feeding products to said product feeder troughs; and (e) simultaneously vibrating only said product feeder troughs corresponding to accumulator chambers discharged after the product discharge to feed a new product batches to each of said discharged accumulator chambers; the improvement which comprises:

(f) utilizing a nutating distribution disc drive assembly to impart radial motion to the product when feeding product to said product feeder troughs.

7. The method as set forth in claim 6 including the further step of:

(g) adjusting the amplitude of the nutating motion being imparted to the distribution disc drive assembly such that it is compatible with the product being packaged, its handling characteristics and the target weight of the package.

8. The method as set forth in claim 6 including the further step of:

(h) dynamically balancing the distribution disc drive assembly to eliminate vibrations by locating the epicenter of the nutating drive at the center of gravity of the distribution disc drive assembly.

9. An improved combination weighing machine of the type in which a feeder mechanism transports product supplied by a product source, a plurality of accumulator chambers that receive product from said feeder mechanism, hold said product and selectively discharge said product therefrom, a door on each said accumulator chamber to discharge product therefrom and a door operating means to selectively open and close said door, a plurality of weighing devices, each including a weigh bucket to receive initial batches of product from said accumulator chambers, and a recording device to record the weight of the product batch in each weight bucket; and collection chambers to receive batches of product that have had their weight determined and recorded, consolidate these batches, and direct them to another location, wherein the improvement comprises:

said feeder mechanism includes a distribution disc drive assembly and a nutating drive therefor, said distribution disc drive assembly such that it imparts only radial motion to the products fed to it by said product source.

10. The invention as set forth in claim 9 in which:

the epicenter of said nutating drive is located at the center of gravity of the distribution disc drive assembly which dynamically balances the distribution disc drive assembly and eliminate vibrations therefrom.

11. The invention as set forth in claim 9 which further includes:

a restrainer connected to said distribution disc drive assembly to prevent its rotation such that only radial motion is imparted to the product.

12. A combination weighing machine comprising:

a distribution disc having upper and lower surfaces, said distribution disc being located relative to an external bulk product source such that it can receives a flow of bulk product on its upper surface;

a drive for said distribution disc including a rotary power source having an output shaft that rotates about a first axis, a drive transfer member drivingly connected to said output shaft and rotatable therewith, said drive transfer member having an outer cylindrical surface generated about a second axis that intersects with said first axis, a distribution disc drive assembly including said distribution disc and a driven member secured to its bottom surface, said driven member having a cylindrical bore formed therein that receives said outer cylindrical surface of said drive transfer member such that said cylindrical bore and said outer cylindrical surface are coaxial and said drive transfer member transmits a nutating motion to said driven member and distribution disc.

13. The invention as set forth in claim 12 which further includes, a restraining device to prevent rotation of said distribution disc drive assembly such that only radially outward directional movement is imparted to product deposited on the upper surface of the distribution disc.

14. The invention as set forth in claim 12 in which said first and second axis intersect at the center of gravity of the distribution disc drive assembly to thereby eliminate undesirable vibrations therefrom.

15. The invention as set forth in claim 14 in which the center of gravity of the distribution disc drive assembly is on the lower surface of said distribution disc.

16. The invention as set forth in claim 12, wherein the driving connection between the output shaft and the drive transfer member permits the drive transfer member to be removed and released from the output shaft by moving the drive transfer member along said first axis in the direction away from said rotary power source, such that the drive transfer member can be easily replaced with another drive transfer member that has its outer cylindrical surface generated about a second axis that intersects with said first axis at a different angle to thus impart a different or modified nutating behavior to the distribution disc.

17. The invention as set forth in claim 16, wherein the invention further includes a thrust bearing surrounding said output shaft and supporting said drive transfer member limiting its movement in the direction toward the rotary power source.

18. The invention as set forth in claim 16, wherein ball bearings are secured to the outer cylindrical surface of the drive transfer member and are received within the cylindrical bore formed in said driven member to enhance relative rotary motion between the drive transfer member and the driven member.

19. The invention as set forth in claim 12, wherein the invention further includes a thrust bearing surrounding said output shaft and supporting said drive transfer member.

20. The invention as set forth in claim 12, wherein ball bearings are secured to the outer cylindrical surface of the drive transfer member and are received within the cylindrical bore formed in said driven member to enhance relative rotary motion between the drive transfer member and the driven member.

21. The invention as set forth in claim 20, wherein the cylindrical bore formed in said driven member has a shoulder formed at its inner end that engages said ball bearings to thus limit axial movement of the driven member relative to the drive transfer member in the direction toward the rotary power source.

22. A combination weighing machine that meters out package weigh quantities of solid product from a stream of bulk product, each package weight quantity complying with a predetermined package target weight limitations, comprising:
 a distribution disc having a center and an upper surface, said distribution disc being located relative to an external bulk product source such that it can receive a flow of bulk product on its upper surface;
 a restraining device to prevent rotation of said distribution disc;
 a drive for transmitting a nutating motion to said distribution disc thereby causing the distribution disc to impart a radially outward directional movement to product deposited thereon;
 a plurality of feeder troughs, each having receiving and discharge ends, extending in a radially outward direction from the center of said distribution disc, the receiving ends of the feeder troughs located relative to said distribution disc such that product that moves radially outward from the distribution disc is deposited at the receiving ends of the feeder troughs;
 a plurality of vibrators each operatively connected with one of said feed troughs and being selectably actuatable to vibrate said feed trough to advance product from said receiving end to said discharge end,
 a plurality of accumulator chambers positioned relative to said feed troughs such that product discharged from the feed troughs is received by the accumulator chambers,
 a plurality of weighing devices, each including a weigh bucket, for weighing or counting product introduced into each of said weigh buckets;
 said accumulator chambers having independently operable doors that when opened cause the product in the accumulator chamber to flow into its associated weigh bucket;
 a combination computing unit adapted to compute combinations, based on weight values supplied to it by each of said weighing devices, that meets the package target weight limitations.

23. The invention as set forth in claim 22, wherein the invention further includes:
 said distribution disc having a lower surface;
 said drive for transmitting a nutating motion to said distribution disc including a rotary power source having an output shaft that rotates about a first axis, a drive transfer member drivingly connected to said output shaft and rotatable therewith, said drive transfer member having an outer cylindrical surface generated about a second axis that intersects with said first axis,
 a distribution disc drive assembly including said distribution disc and a driven member secured to its bottom surface, said driven member having a cylindrical bore formed therein that receives said outer cylindrical surface of said drive transfer member such that said cylindrical bore and said outer cylindrical surface are coaxial and said drive transfer member transmits a nutating motion to said distribution disc drive assembly to thereby impart only radially outward directional movement to product deposited on the upper surface of the distribution disc.

24. The invention as set forth in claim 23, wherein the driving connection between the output shaft and the drive transfer member permits the drive transfer member to be removed and released from the output shaft by moving the drive transfer member along said first axis in the direction away from said rotary power source, such that the drive transfer member can be easily replaced with another drive transfer member that has its outer cylindrical surface generated about a second axis that intersects with said first axis at a different angle to thus impart a different or modified nutating behavior to the distribution disc.

25. The invention as set forth in claim 24, wherein the invention further includes a thrust bearing surrounding said output shaft and supporting said drive transfer member limiting its movement in the direction toward the rotary power source.

26. The invention as set forth in claim 24, wherein ball bearings are secured to the outer cylindrical surface of the drive transfer member and are received within the cylindrical bore formed in said driven member to enhance relative rotary motion between the drive transfer member and the driven member.

27. The invention as set forth in claim 23, wherein the invention further includes a thrust bearing surrounding said output shaft and supporting said drive transfer member.

28. The invention as set forth in claim 23, wherein ball bearings are secured to the outer cylindrical surface of the drive transfer member and are received within the cylindrical bore formed in said driven member to enhance relative rotary motion between the drive transfer member and the driven member.

29. The invention as set forth in claim 22 in which said first and second axis intersect at the center of gravity of the distribution disc drive assembly to thereby eliminate undesirable vibrations therefrom.

30. The invention as set forth in claim 24 in which the center of gravity of the distribution disc drive assembly is on the lower surface of said distribution disc.

31. The invention as set forth in claim 28, wherein the cylindrical bore formed in said driven member has a shoulder formed at its inner end that engages said ball bearings to thus limit axial movement of the driven member relative to the drive transfer member in the direction toward the rotary power source.

* * * * *